(12) United States Patent
Kim

(10) Patent No.: US 7,991,134 B2
(45) Date of Patent: Aug. 2, 2011

(54) INTELLIGENT TELEPHONE SET

(75) Inventor: Hack Kim, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 907 days.

(21) Appl. No.: 11/951,769

(22) Filed: Dec. 6, 2007

(65) Prior Publication Data

US 2008/0075248 A1  Mar. 27, 2008

Related U.S. Application Data

(60) Continuation of application No. 10/441,358, filed on May 20, 2003, now abandoned, which is a division of application No. 09/824,116, filed on Apr. 2, 2001, now Pat. No. 6,584,188.

(51) Int. Cl.
  *H04M 1/56* (2006.01)
  *H04M 15/06* (2006.01)

(52) U.S. Cl. ............. 379/142.01; 379/93.17; 379/93.13; 379/142.04; 379/142.17

(58) Field of Classification Search ............... 379/93.24, 379/142.07, 142.12, 142.14, 142.15, 212.01, 379/142.13, 93.17, 93.23, 142.01, 142.04, 379/142.05, 142.17; 455/414, 416, 417
See application file for complete search history.

(56) References Cited

U.S. PATENT DOCUMENTS

| | | | |
|---|---|---|---|
| 4,924,496 A | 5/1990 | Figa et al. | |
| 4,942,598 A | 7/1990 | Davis | |
| 4,995,075 A | 2/1991 | Angiolillo-Bent et al. | |
| 5,467,629 A * | 11/1995 | Albert | 72/164 |
| 5,473,671 A * | 12/1995 | Partridge, III | 455/445 |
| 5,559,860 A * | 9/1996 | Mizikovsky | 455/413 |
| 5,602,908 A | 2/1997 | Fan | |
| 5,604,791 A | 2/1997 | Lee | |
| 5,734,706 A | 3/1998 | Windsor et al. | |
| 5,841,850 A | 11/1998 | Fan | |
| 5,841,855 A | 11/1998 | Davidson et al. | |
| 5,883,942 A * | 3/1999 | Lim et al. | 379/142.01 |
| 5,894,504 A | 4/1999 | Alfred et al. | |
| 5,930,338 A | 7/1999 | McKendry et al. | |
| 5,930,700 A * | 7/1999 | Pepper et al. | 455/435.3 |
| 5,946,386 A * | 8/1999 | Rogers et al. | 379/265.09 |
| 5,949,866 A | 9/1999 | Coiera et al. | |
| 5,978,451 A * | 11/1999 | Swan et al. | 379/88.24 |
| 6,016,341 A | 1/2000 | Lim | |
| 6,026,152 A | 2/2000 | Cannon et al. | |
| 6,031,899 A * | 2/2000 | Wu | 379/142.01 |
| 6,038,291 A | 3/2000 | Cannon et al. | |
| 6,125,287 A | 9/2000 | Cushman et al. | |
| 6,178,230 B1 * | 1/2001 | Borland | 379/67.1 |
| 6,195,569 B1 | 2/2001 | Frederiksen | |
| 6,304,636 B1 | 10/2001 | Goldberg et al. | |
| 6,359,970 B1 * | 3/2002 | Burgess | 379/67.1 |
| 6,377,668 B1 | 4/2002 | Smock et al. | |
| 6,389,124 B1 | 5/2002 | Schnarci et al. | |
| 6,408,180 B1 | 6/2002 | McKenna et al. | |
| 6,411,696 B1 | 6/2002 | Iverson et al. | |

(Continued)

*Primary Examiner* — Binh K Tieu

(57) ABSTRACT

An intelligent telephone set is disclosed that includes a caller-ID circuit that extracts a call identifier from an incoming call. A call processing circuit in communication with the caller-ID circuit assigns the incoming call to a caller category associated with the call identifier. Subsequently, it selects a call processing action corresponding to the caller category and processes the incoming call using the selected call processing action. The intelligent telephone set allows users to set criteria for receiving and processing calls based on CID data. One such call processing action is to use CID data to forward an incoming call to a predetermined location.

37 Claims, 4 Drawing Sheets

U.S. PATENT DOCUMENTS

| | | |
|---|---|---|
| 6,434,394 B1 | 8/2002 | Grundvig et al. |
| 6,463,145 B1 | 10/2002 | O'Neal |
| 6,477,374 B1 | 11/2002 | Shaffer et al. |
| 6,570,596 B2 | 5/2003 | Frederiksen |
| 6,597,279 B1 | 7/2003 | Haraguchi |
| 6,961,590 B1 | 11/2005 | Toebes |
| 2001/0024965 A1 | 9/2001 | Hayashi |

\* cited by examiner

INTELLIGENT TELEPHONE SET

RELATED APPLICATIONS

This patent application is a continuation application of patent application Ser. No. 10/441,358, filed May 20, 2003, which is a divisional of patent application Ser. No. 09/824,116, filed Apr. 2, 2001, (now U.S. Pat. No. 6,584,188).

BACKGROUND OF THE INVENTION

1. Field of the Invention

The present invention relates generally to telephone devices, and particularly to an intelligent telephone set equipped with caller-ID and call forwarding capabilities.

2. Technical Background

The local exchange carriers (LECS) offer their customers various services such as caller ID (CID), call forwarding, and voice mail. Caller identification (CID) services are offered by the telephone companies to provide caller information to called parties. Typically, the CID is the caller's telephone number. The CID information is used to track incoming calls, to trace malicious and prank calls, to store identified numbers for re-dial, and to block unwanted calls. Most countries employ the 1200 baud Bell 202 standard or the CCITT V.23 FSK format to provide CID services.

In one approach that has been considered, a telecommunications device was equipped to receive and analyze packetized information preceding the incoming call. The packetized information identified the call as being either a speech type call or data type call. The device generated a distinct ringing tone for data messages, and another distinct ringing tone for speech data. Based on the tone, the device doubled as a telephone set and a facsimile machine.

In another approach that has been considered, the service provider used an ISDN network to provide a signaling channel out of the voice band to transmit call forwarding information to the called party's telephone set. The call was forwarded without the called party having to answer the call. The call was also forwarded without having to interrupt an on-going call.

While the above mentioned applications are useful, they are quite limited in their use of CID information. What is needed is an intelligent telephone set that allows a user to set criteria for receiving and processing calls based on CID data stored in the telephone set. In addition, an intelligent telephone set is needed that is capable of using CID data to forward calls in accordance with the extracted CID data. Typically, network based call forwarding services have to be manually activated and inactivated by the user. This often results in users being charged for unwanted calls being forwarded to their wireless units. By using an intelligent telephone set that forwarded calls using CID data, users could bypass the call forwarding services offered by the local exchange carriers.

SUMMARY OF THE INVENTION

The present invention addresses the above stated problems. An intelligent telephone set is provided that allows users to set criteria for receiving and processing calls based on CID data. The intelligent telephone set of the present invention also uses CID data to forward calls. The present invention provides CID, voice mail, and call-forwarding services while bypassing the Local Exchange Carriers (LECS). The present invention is applicable to the wireline network as well as the wireless network.

One aspect of the present invention is a telephone device for use in a telecommunications network. The telephone device is coupled to the telecommunications network by a plurality of telephone lines. The telephone device includes a caller-ID circuit operative to extract a call identifier from an incoming call propagating on a first telephone line of the plurality of telephone lines. A call processing circuit is coupled to the caller-ID circuit, the call processing circuit being operative to assign the incoming call to a caller category based on the call identifier, to select a call processing action corresponding to the caller category, and to process the incoming call in accordance with the selected call processing action.

In another aspect, the present invention includes a telephone set for use in a telecommunications network. The telephone set includes a caller-ID component coupled to the network, the caller-ID component is operative to extract a call identifier from an incoming call. A processor is coupled to the caller-ID component. The processor is programmed to assign the incoming call to a caller category based on the call identifier, the caller category being one of a plurality of caller categories, and process the incoming call in accordance with one of a plurality of call processing routines, the processor selecting a call processing routine corresponding to the assigned caller category.

In another aspect, the present invention includes a telephone device for use in a telecommunications network. The telephone device is coupled to the telecommunications network by a plurality of telephone lines. The telephone device includes a database component having stored therein a plurality of caller identifiers, each caller identifier being associated with one calling category of a plurality of calling categories. A caller-ID circuit is operative to extract a call identifier from an incoming call propagating on a first telephone line of the plurality of telephone lines. A call processing circuit is coupled to the caller-ID circuit and the database. The call processing circuit being operative to associate the incoming call to a caller category based on the call identifier association in the database, to select a call processing action corresponding to the caller category, and to process the incoming call in accordance with the selected call processing action. A call forwarding circuit is coupled to the call processing circuit. The call forwarding circuit is operative to forward the incoming call to a predetermined telephone number over the second telephone line when the call identifier is associated with a predetermined caller category.

In another aspect, the present invention includes a telephone device for use in a telecommunications network. The telephone device is coupled to the telecommunications network by a plurality of telephone lines. The telephone device includes a database having stored therein data, the data including a plurality of caller identifiers, each caller identifier being associated with one calling category of a plurality of calling categories. A caller-ID circuit is operative to extract a call identifier from an incoming call propagating on one of the plurality of telephone lines. A call processing circuit is coupled to the caller-ID circuit and the database. The call processing circuit is operative to associate the incoming call to a caller category based on the call identifier association in the database, to select a call processing action corresponding to the caller category; and to process the incoming call in accordance with the selected call processing action. A data entry component is coupled to the database, the data entry component being operative to add data to the database, modify data in the database, or delete data from the database.

In another aspect, the present invention includes a method for processing an incoming telephone call using a telephone set. The telephone set is coupled to a telecommunications network by a plurality of telephone lines. The telecommunications network including both wireline networks and wireless networks. The method includes extracting a call identifier from the incoming call propagating on a first telephone line of the plurality of telephone lines. The incoming call is assigned to a caller category based on the call identifier. A call processing action is selected corresponding to the caller category. The incoming call is processed in accordance with the selected call processing action.

In another aspect, the present invention includes a method of providing and selecting from a menu on the display of a telephone set. The telephone set having a database, an instruction set, and a graphical user interface having a display and a data entry device. The method includes retrieving a set of menu entries from the menu. The menu entries are displayed on the display, each menu entry representing a telephone set maintenance operation. One menu entry is selected from the set of menu entries on the display using the data entry device. The operation representing the selected menu entry is performed. A signal from the telephone set is transmitted, the signal being indicative of the selected menu entry.

In another aspect, the present invention includes a computer readable medium having stored thereon a database. The database includes a first portion having stored therein a plurality of caller identifiers. Each caller identifier being associated with one calling category of a plurality of calling categories. A second portion includes a library of ringing tones, each ringing tone being associated with one calling category of the plurality of calling categories. A third portion includes a record log for storing at least one call characteristic of at least one telephone call established between the telephone set and a remote destination telephone set.

In another aspect, the present invention includes a computer readable medium having stored thereon a data structure. The data structure includes an incoming caller identifier, a date of an incoming call, a time of the incoming call, and a caller category.

In another aspect, the present invention includes a computer readable medium having stored thereon a data structure. The data structure includes a calling party identifier, a date of an outgoing call, a time of the outgoing call, a caller category, and a duration of the outgoing call.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
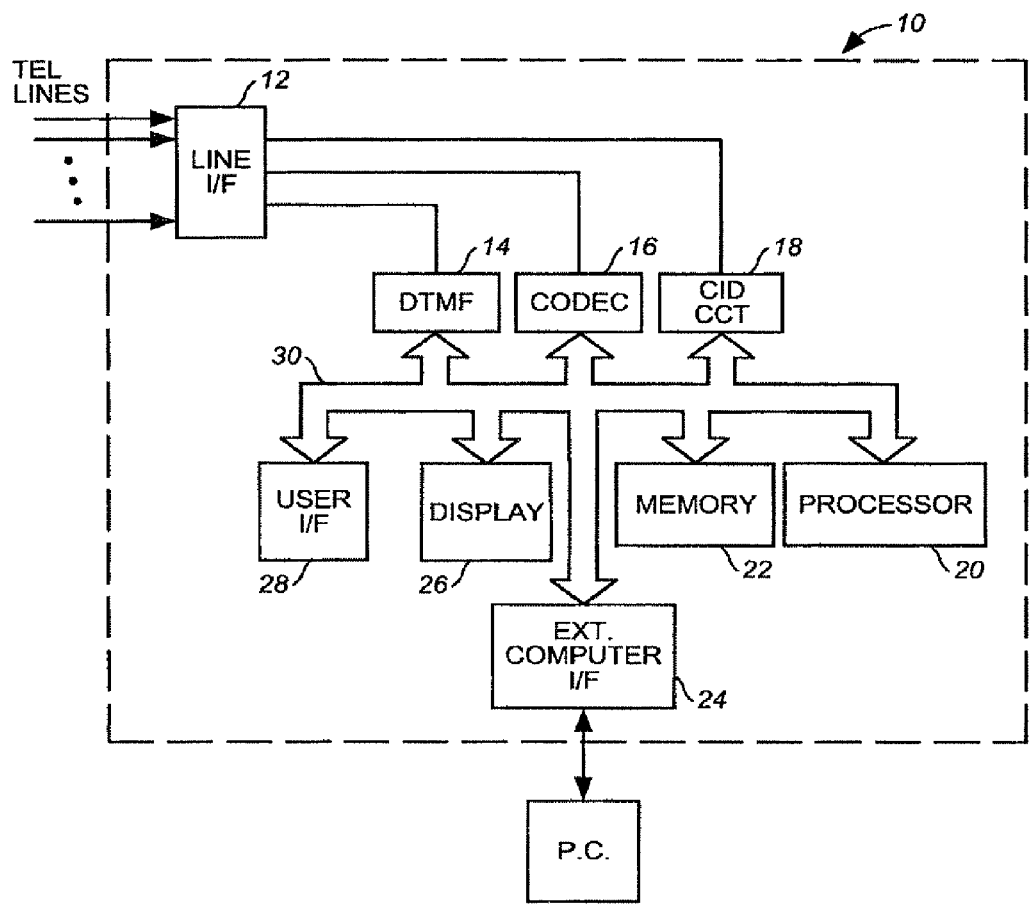
FIG. 1 is a functional block diagram of an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the telephone set of the present invention is shown in FIG. 1, and is designated generally throughout by reference numeral 10.

In accordance with the invention, the present invention for an intelligent telephone set includes a caller-ID circuit operative to extract a call identifier from an incoming call propagating on a telephone line. A call processing circuit is coupled to the caller-ID circuit. The call processing circuit assigns the incoming call to a caller category based on the call identifier. The caller categories include important calls, regular calls, and undesirable calls. However, the present invention allows the user to create any number of caller categories. After the incoming call has been assigned to a caller category, a call processing action is selected that corresponds to the caller category. The incoming call is processed in accordance with the selected call processing action. Thus, the intelligent telephone set allows users to set criteria for receiving and processing calls based on CID data. The intelligent telephone set also uses CID data to forward calls.

As embodied herein, and depicted in FIG. 1, a functional block diagram of the intelligent telephone set 10 in accordance with one embodiment of the present invention is disclosed. Telephone set 10 includes line interface 12 which accommodates a plurality of telephone lines connected to the public telephone network. Line interface 12 is connected to DTMF transceiver 14, PCM codec 16, and caller ID circuit 18. Telephone set 10 also includes processor 20, memory 22, computer interface 24, display 26, and user interface 28. All of the above listed elements are coupled by system bus 30.

Line interface 12 may be of any suitable type, but by way of example, interface 12 includes an integrated circuit, such as a Motorola MC34010P, coupled to isolation transformers. The isolation transformers prevent grounding problems. As one of ordinary skill in the art will recognize, signals from the network are translated by interface 12 into signals having a correct format and amplitude. Interface 12 may also include a buffer amplifier and an adjustable potentiometer to provide optimal signal levels.

DTMF (dual tone multi-frequency) transceiver 14 is operative to generate and detect audible tones associated with a telephone network. DTMF 14 is also adapted to generate DTMF dialing tones to initiate a call through the telephone lines coupled to interface 12. DTMF 14 detects DTMF tones received from the telephone line via line interface 12.

PCM codec transceiver 16 uses a standard digitization scheme to band limit voice frequencies to the 300-3300 Hz frequency band. Codec 18 performs an A/D conversion of an analog voice message using a :-law companding scheme. When sampling the analog waveform, larger amplitudes are compressed relative to the smaller amplitudes, providing an equivalent 12-bit accuracy within an 8-bit digital word. The 8-bit words generated by codec 18 can be stored in RAM 26, or in a memory resident in processor 22. In one embodiment, codec 16 includes a semiconductor IC manufactured by SGS Thompson or by the National Semiconductor Company having the product number ETC5056, or equivalent.

Caller ID circuit 18 may be of any suitable type, but there is shown by way of example a single CID receiver chip 18. In one embodiment, CID receiver chip 18 is an integrated circuit that includes an A/D converter, a CID detection circuit, a gain adjusting circuit, a demodulator, and a serial-to-parallel buffer. The detection circuit in CID circuit 18 recognizes a channel seizure signal that alerts chip 18 that a CID mark signal will follow. After synchronizing with the mark signal, CID circuit 18 receives a CID data packet that includes CID information such as telephone number, name, date, time, and error correction information. After extracting the CID data, the serial-to-parallel buffer converts the CID data into digital words suitable for transmission on system bus 30.

In one embodiment, processor 20 is implemented using an off-the-shelf microprocessor such as a Pentium processor manufactured by Intel. In another embodiment, a DSP manufactured by Motorola or some other manufacturer is used. Those of ordinary skill in the art will also recognize that processor 20 can also be implemented using application specific integrated circuits (ASIC), or a combination of off-the-shelf processors and ASICs in the design.

Processor 20 is programmed to support conventional call handling functions. After CID circuit 18 extracts the CID information from an incoming call, processor 20 must process the incoming call based on the CID information. Among other things, processor 20 supports remote reprogramming, call forwarding, voice mail, and conference calls. In one embodiment, the conference call function supports two-or more lines with selective per-caller disconnect capability. In another embodiment, processor 20 includes a processor programmed to handle call processing, and another processor to accommodate the call forwarding processing. One of ordinary skill in the art will also recognize that in other embodiments certain call handling functions such as voice detection, pre-recorded voice responses, and voice mail are implemented as separate units within telephone set 10.

Memory 22 may be of any suitable type, but by way of example, memory 22 includes a read/write random access memory (RAM) used in data processing and data I/O, and a programmable read only memory for storing programming instructions and database information used by processor 20. One of ordinary skill in the art will recognize that the memory used to store the programming instructions and the data base may be implemented using a DRAM, PROM, EEPROM, a hard drive, diskettes, a compact disk device, or any other computer readable medium. A diagrammatic depiction of a memory map in accordance with the present invention will be discussed in more detail below.

Computer interface 24 is adapted to communicate with an external computing device such as a personal computer. The programming instructions and/or database stored in memory 22 can be completely replaced or partially replaced with new instructions down loaded from the external computing device. One of ordinary skill in the art will recognize that data flow is bi-directional. For example, in one embodiment, processor 20 directs the personal computer to transmit an e-mail to a predetermined e-mail address via computer interface 24.

Display 26 may be of any suitable type, but by way of example, display 26 includes a liquid crystal display capable of displaying CID information, dialing information, the contents of the database, menu information, programming instructions, or any other information that can be displayed graphically.

User interface 28 may be of any suitable type, but there is shown by way of example an input/output circuit coupled to system bus 30. User interface 28 is connected to the telephone's twelve-key dialing device, a function key set, a keyboard for data entry and programming functions, a speaker, and a microphone.

Figure 2A:
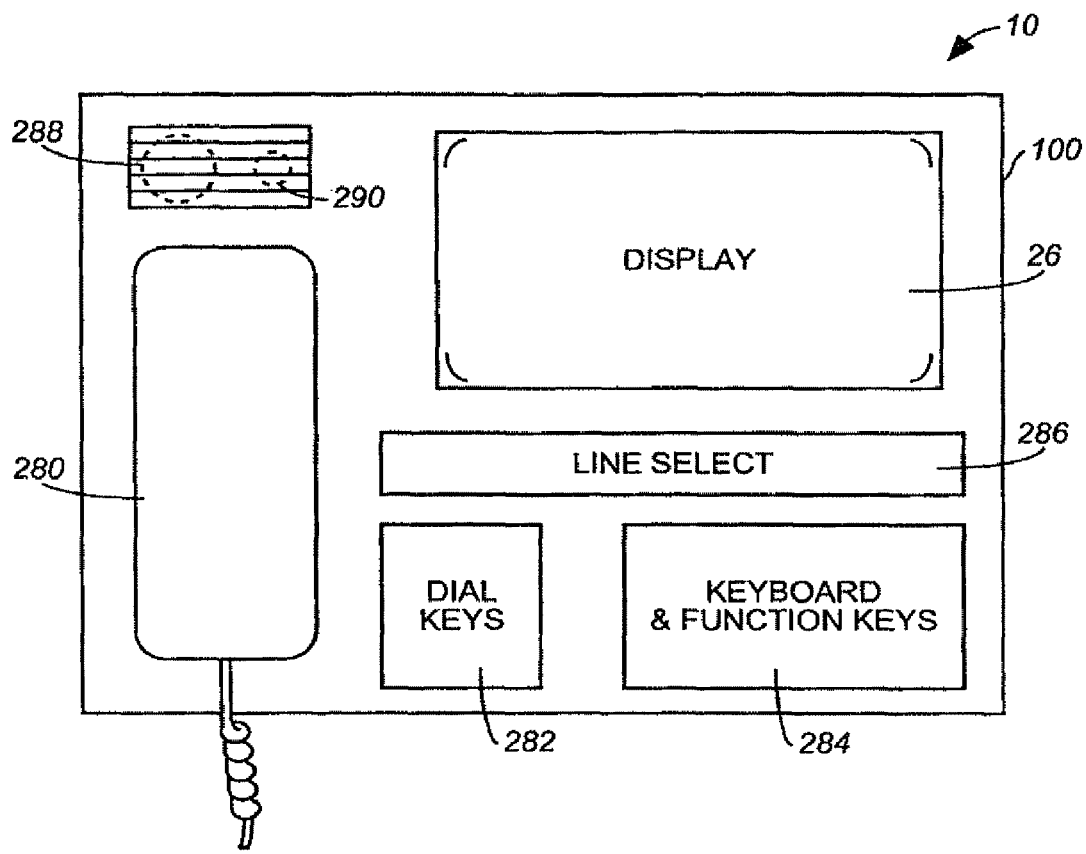
FIG. 2A is a top view of the housing of one embodiment of the present invention.

As embodied herein and depicted in FIG. 2A, a top view of the telephone set housing 100 in accordance with one embodiment of the present invention is disclosed. Housing 100 may be formed using a hard plastic material. In the embodiment depicted in FIG. 2A, housing 100 accommodates a standard telephone receiver 280, twelve-key dialing device 282, keyboard 284, line selection device 286, display 26, speaker 288, and microphone 290. One of ordinary skill in the art will recognize that other housing arrangements are possible within the scope of the present invention. Twelve-key dialing device 282 includes digits 0-9, the "*" key, and the "#" key. In one embodiment, keyboard 284 includes function keys F1-F12, control keys (such as an insert key, a delete key, a return key, and etc), and the basic character keys. Line selection device 286 includes a plurality of keys allowing the user to select one of the plurality of telephone lines connected to intelligent telephone set 10. In one embodiment, line select portion 286 also includes an interrupt button, a speaker-phone button, and a conference-call button. The interrupt button allows the user to interrupt voice-mail and communicate directly with a calling party.

Figure 2B:
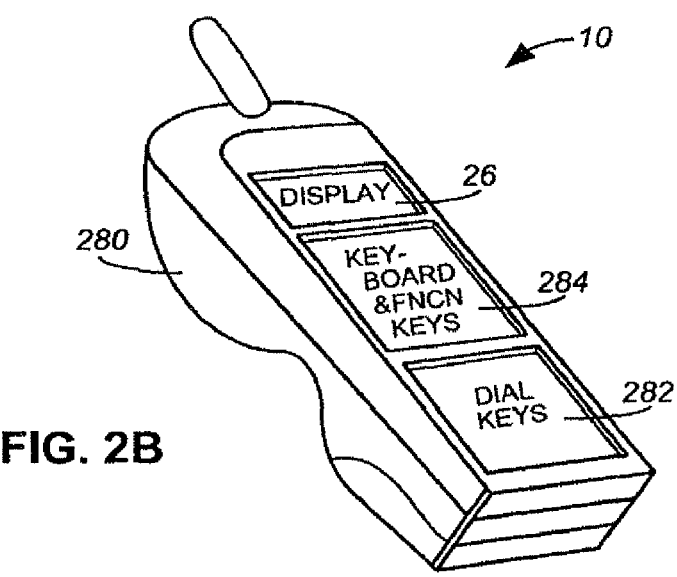
FIG. 2B is a perspective view of a wireless embodiment of the present invention.

As embodied herein and depicted in FIG. 2B, a perspective view of a wireless embodiment 10 of the present invention is disclosed. Wireless telephone set 10 includes handset 280, twelve-key dialing device 282, keyboard 284, and liquid crystal display 26.

Figure 3:
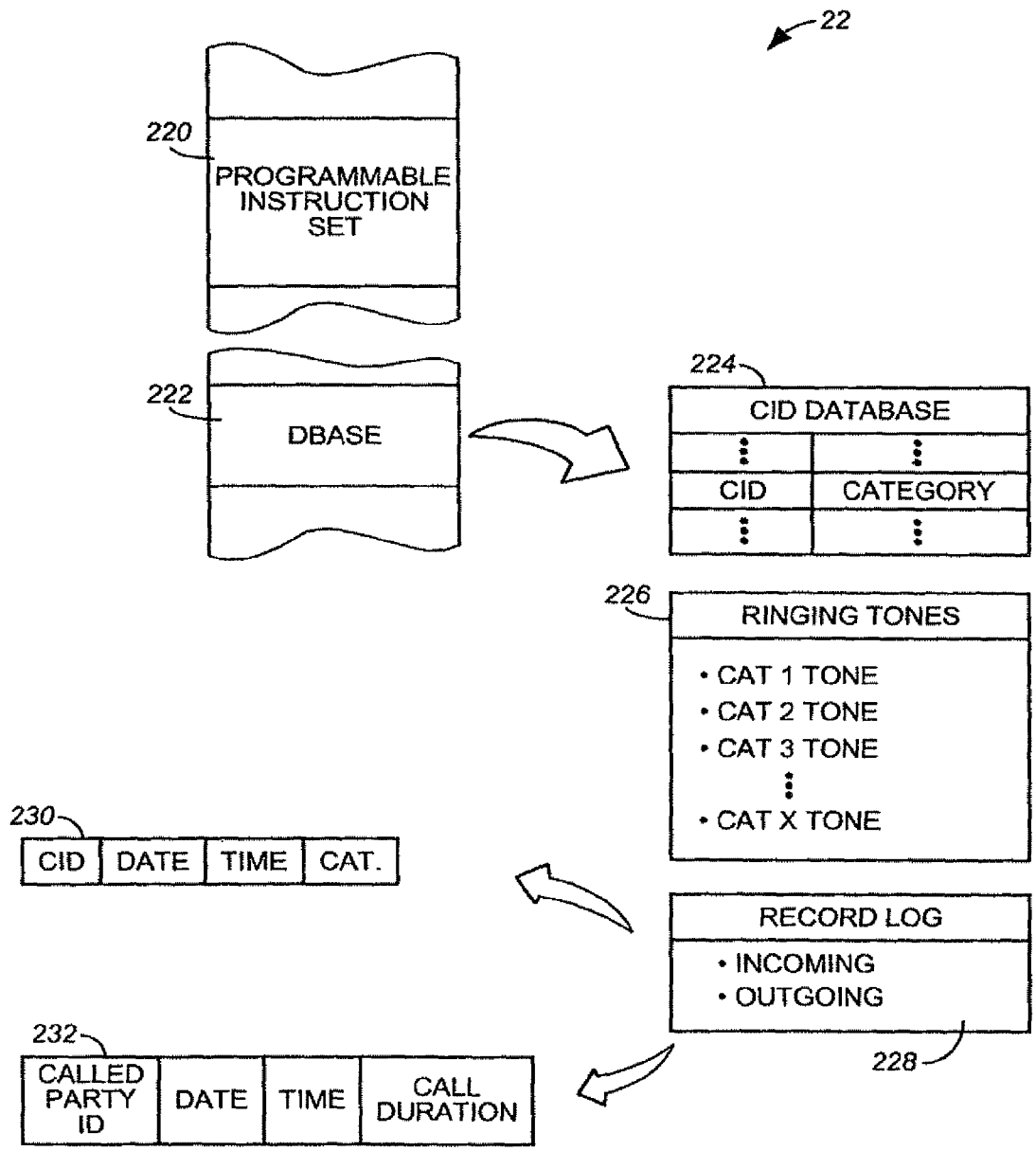
FIG. 3 is a diagrammatic depiction of the memory map in accordance with one embodiment of the present invention.

As embodied herein and depicted in FIG. 3, a diagrammatic depiction of the memory map in accordance with one embodiment of the present invention is disclosed. Memory 22 includes programmable instruction set 220 and database 222. One of ordinary skill in the art will recognize that programmable instruction set 220 is a subset of the total instruction set used by processor 20. When accessing programmable instruction set 220, the user employs display 26 and keyboard 284 (shown in FIG. 2) to retrieve a main menu that lists a set of menu entries.

The set of menu entries displayed has entries including a listing of programmable instruction set 220, programming choices for programmable instruction set 220, the contents of database 222, and database programming options. After the menu entries are displayed, the user selects one menu entry on the display. For example, a cursor key in combination with the enter key can be used to perform the selection step. In another embodiment, a mouse is provided to allow the user to double-click on the selected entry. In yet another embodiment, a track-ball mechanism is used in the selection process.

After the selection is made, the menu programming transmits a signal to the user indicating the menu selection. In one embodiment, the signal includes both a visual signal shown on display 26 and an audio signal transmitted via speaker 288.

Subsequently, the user performs programming, searching and data entry tasks using keyboard 284. The menu system described above allows the user to search programmable instruction set 220 and database 222, and modify programmable instruction set 220 and database 222. Modification of set 220 and database 222 includes making additions, deletions, or merely changing some characteristic of the stored instruction or data.

Referring again to FIG. 3, database 222 includes a directory storage database 224, a library of ringing tones 226, and record log 228. Directory storage database 224 associates caller-ID information to a caller category. In one embodiment, the caller categories include an important call category, a regular call category, and a undesirable call category. The important call category is a "hot list" that may include family, friends, business associates or other VIPs that may considered import to the user. The regular category may include other less important people, associates, or businesses. The regular category is also the default category. If an incoming call includes CID information not stored in the database, processor 20 processes the call as a regular call. The undesirable category includes people, businesses, or associations that the user does not want to talk to. As discussed above, one of ordinary skill in the art will recognize that the present invention should not be construed as being limited to only three caller categories. Any number of categories can be created using the present invention. The number of categories is user defined. The number of entries in each category is also user defined, and depends the amount of memory included in device 10.

Database 226 includes a library of ringing tones. The ringing tone selected for each category is programmable by the user. Processor 20 can be program to employ a unique ringing pattern for each call category. For example, processor 20 may retrieve a "category 1" ringing tone when CID circuit 18 determines that the incoming call is in the important call category. Processor 20 may also be programmed to select category X ringing tone for the undesirable call category. In the example shown in FIG. 3, there are "X" tones available. X is an integer number that depends on the size of memory 22.

Database 222 also includes record log 228, which includes an incoming call portion and an outgoing call portion. In one embodiment, the incoming call record log employs data structure 230 which includes CID information, the date of the incoming call, the time of the incoming call, and the category of the incoming call. The outgoing call record log uses data structure 232 which includes a called party ID, date of the outgoing call, time of the outgoing call, and the duration of the call. In one embodiment, the stored CID information is configured to include a name, business association when applicable, telephone number, area code, and country code.

One of ordinary skill in the art will recognize that the present invention is flexible in that any number of data structures can be used to build record log 228. Using the menu system described above, the record log can be retrieved, searched, or sorted. For example, a user may want to view the incoming calls chronologically. On another occasion, the user may want to determine the CID of the party with the highest frequency of incoming calls. One of ordinary skill in the art will recognize that the present invention should not be construed as being limited to these examples.

Figure 4:
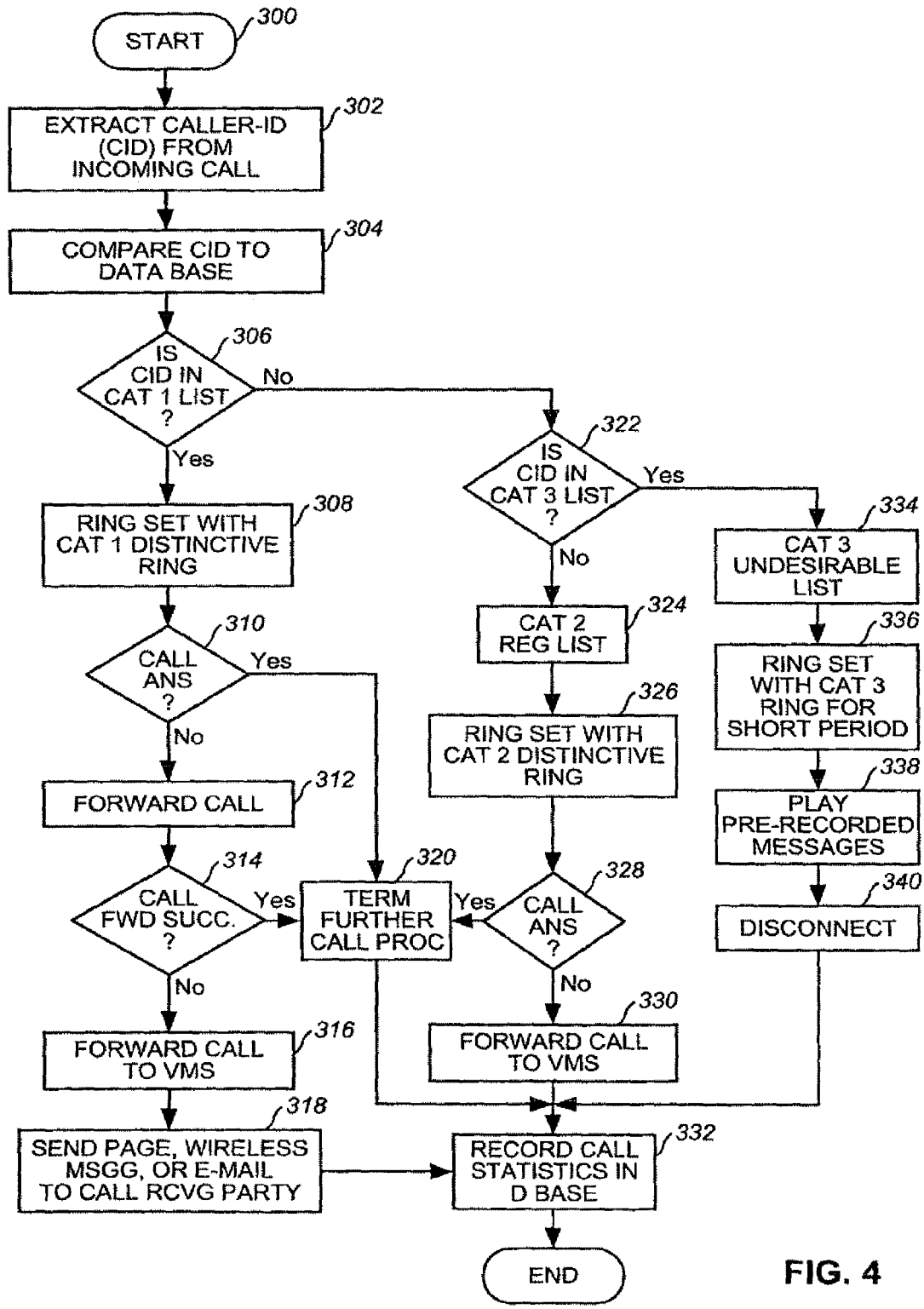
FIG. 4 is a flow chart showing call processing in accordance with one embodiment of the present invention.

As embodied herein and depicted in FIG. 4, a flow chart showing call processing in accordance with an embodiment of the present invention is disclosed. In step 302, CID circuit 18 extracts the CID information from the incoming call. In step 304, processor 20 compares the extracted CID with the stored CID data in database 224. Subsequently, processor 20 uses the CID data to determine the appropriate call category.

In step 306, processor 20 determines whether the CID is in the important category. If it is, processor 20 retrieves the distinctive ringing tones associated with the important call category from the library of tones stored in database portion 226. In step 310, processor 20 allows telephone set 10 to ring for a predetermined number of times before determining that the party being called is not available. Of course, the number of times the phone rings is programmed by the user using the menu system described above. If the call is answered by the party being called, all further call processing is terminated.

However, processor 20 will record the call characteristics in record log 228 using data structure 230 (See FIG. 3).

If the call is not answered, processor 20 performs step 312. In step 312, processor 20 retrieves an audible menu system that gives the calling party several options. The calling party can choose to have its call forwarded. If the calling party is the user himself, he can enter a system password, and the menu system will allow the user to program intelligent telephone set 10 from a remote location. If the calling party requests the call forwarding option, one of the plurality of telephone lines connected to line interface 12 is seized, and an attempt is made to establish a call with a preprogrammed number stored in memory.

In step 314, if the call forwarding attempt is not successful processor 20 retrieves a voice message from memory 22 and informs the calling party that the call forwarding attempt was unsuccessful. The incoming call is then forwarded to the voice mail system. Depending on the programming selections made by the user, step 318 causes processor 20 to send either a page, a wireless message, or an e-mail to the part that was called. Finally, in step 332, processor 20 records the call characteristics in record log 228 using data structure 230 (See FIG. 3).

Referring back to step 306, if processor 20 determines that the extracted CID is not in the important category, it then determines in step 322 whether the extracted CID is in the undesirable category. Note that if an incoming call is not in the undesirable category, processor 20 assume that it is in the regular category, since the regular category is the default category. While this example shows a system accommodating only three categories, one of ordinary skill in the art will recognize that the present invention can be programmed to accommodate four or more categories.

If the incoming call is not in the undesirable category, processor 20 retrieves the distinctive ringing tones associated with the regular category from the library of tones stored in database portion 226. In step 328, processor 20 allows telephone set 10 to ring for a predetermined number of times before determining that the called party is not available. If the call is not answered, processor 20 retrieves a voice message from memory 22 informing the calling party that there is no one available to answer the call, and processor 20 forwards the incoming call to the on-board voice mail system. Obviously, the user may set the predetermined number of times to zero if he so desires. He can then review his voice mail at some point in the future.

If the call is answered by the party being called, all further call processing is terminated in step 320. However, processor 20 will again record the call characteristics in record log 228 using data structure 230.

Referring back to step 322, if processor 20 determines that the incoming call is an undesirable call, processor 20 retrieves the distinctive ringing tone associated with the undesirable category from the library of tones stored in database portion 226. In step 336, processor 20 allows telephone set 10 to ring for a short period, such as two rings, signaling anyone within listening range that an undesirable call is being processed by intelligent telephone set 10. In the next step, processor 20 retrieves a voice message from memory 22 informing the calling party that there is no one available to answer the call. In step 340, processor 20 disconnects the incoming call. Finally, processor 20 will record the call characteristics of the undesirable call in record log 228 using data structure 230.

When a user places an outgoing call, processor 20 is also programmed to retrieve the telephone number of the called party. As shown in FIG. 3, processor 20 writes the called party's ID, the date of the outgoing call, the time of the outgoing call, and the duration of the call in the outgoing record log 228 using data structure 232. One of ordinary skill in the art will recognize that many variations of this system can be implemented within the scope of the present invention. In one embodiment, processor 20 uses the telephone number of the called party to retrieve associated data from the data base. For example, the telephone number may be associated with a name, a business, or any other amplifying or miscellaneous data.

One of ordinary skill in the art will recognize that the method depicted in FIG. 4 is user defined and can be modified in any number of ways to suit the desires of the user. For example, the user may wish to forward, activate or deactivate the call forward, or change the ring tone for each or any group at any time.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method implemented by a telephone device that includes a database, an instruction set, and a graphical user interface including a display and a data entry device, the method comprising:
    extracting, by the telephone device, a caller identifier from an incoming call;
    assigning, by the telephone device, the incoming call to a caller category based on the caller identifier;
    selecting, by the telephone device, a call processing routine corresponding to the assigned caller category;
    processing, by the telephone device, the incoming call in accordance with the selected call processing routine;
    recording, by the telephone device, the caller identifier, the caller category, and at least one caller statistic in the database;
    retrieving, by the telephone device, a set of menu entries from a menu on the display, where the menu entries include at least an option for modifying the database and an option for sorting a plurality of records in the database, one record including at least one of the caller identifier, the caller category, or the at least one caller statistic;
    receiving, by the telephone device, a selection of one menu entry from the set of menu entries on the display using the data entry device;
    modifying, by the telephone device and when the selected menu entry is the option for modifying the database, at least one of the plurality of records in the database;
    sorting, by the telephone device and when the selected menu entry is the option for sorting the plurality of records in the database, the plurality of records; and
    performing, by the telephone device and when the selected menu entry is other than the option for modifying the database and the option for sorting the plurality of records, a programmable operation represented by the selected menu entry.

2. The method of claim 1, where performing the programmable operation includes searching the database.

3. The method of claim 1, where performing the programmable operation includes adding to the database or deleting at least a portion of the database.

4. The method of claim 1, where the database further comprises:
    a first portion including a library of ringing tones, each ringing tone being associated with one caller category; and
    a second portion including a record log for storing at least one call characteristic of at least one telephone call established between the telephone device and a remote destination telephone device.

5. The method of claim 1, further comprising emitting an audible signal associated with the selected menu entry.

6. The method of claim 1, further comprising displaying a signal associated with the selected menu entry on the display.

7. The method of claim 1, where retrieving a set of menu entries and receiving a selection are performed by one of a voice command, a keyboard entry, a mouse input, or a touch screen input.

8. The method of claim 1, where performing the programmable operation includes one of adding to the instruction set, modifying the instruction set, or deleting at least a portion of the instruction set.

9. The method of claim 4, where the at least one call characteristic includes a telephone number of the incoming call, a date of the incoming call, a time of the incoming call, and the caller category of the incoming call.

10. The method of claim 1, where performing the programmable operation includes one of adding or deleting the caller identifier.

11. The method of claim 1, where the caller category includes one of an important caller category, a regular caller category, or an undesirable caller category.

12. The method of claim 4, where performing the programmable operation includes storing the at least one call characteristic for each outgoing call in the record log.

13. The method of claim 4, where the telephone device is configured to store the at least one call characteristic for each incoming call in the record log for at least thirty days.

14. The method of claim 13, where the at least one call characteristic includes a called party identifier of an outgoing call, a date of the outgoing call, a time of the outgoing call, and a duration of the outgoing call.

15. The method of claim 14, where the caller identifier includes one of a telephone number, a party name, a party affiliation, or an address.

16. The method of claim 1, where the menu entries include an option for searching the instruction set.

17. The method of claim 1, where the menu entries include an option for searching the database.

18. The method of claim 1, where the menu entries include an option for modifying the instruction set.

19. The method of claim 1, where the menu entries include an option for retrieving any record in the database.

20. The method of claim 1, where the menu entries include an option for searching the records in the database.

21. A computer readable medium that stores instructions executable by one or more processors of a device, the medium storing one or more instructions for:
    extracting a call identifier from an incoming call;
    assigning the incoming call to a caller category based on the call identifier, the caller category being one of a plurality of caller categories;
    selecting a call processing routine corresponding to the assigned caller category from a plurality of call processing routines;
    processing the incoming call in accordance with the selected call processing routine;

recording the call identifier, the caller category, and at least one call statistic in the database;

retrieving a set of menu entries from a menu on the display, where the menu entries include at least an option for modifying the database and an option for sorting a plurality of records in the database, one record including at least one of the caller identifier, the caller category, or the at least one caller statistic;

receiving a selection of one menu entry from the set of menu entries on the display using the data entry device;

modifying, when the selected menu entry is the option for modifying the database, at least one of the plurality of records in the database;

sorting, when the selected menu entry is the option for sorting the plurality of records in the database, the plurality of records; and performing, when the selected menu entry is other than the option for modifying the database and the option for sorting the plurality of records, a programmable operation represented by the selected menu entry.

22. The computer readable medium of claim 21, further comprising one or more instructions for:
   emitting a ring with a predetermined ringing tone associated with the caller category;
   forwarding the incoming call to a predetermined destination based on the caller category when the ring is not answered within a predetermined number of ringing cycles; and
   forwarding the incoming call to a voice mail component when forwarding the incoming call to a predetermined destination is unsuccessful.

23. The computer readable medium of claim 21, further comprising one or more instructions for transmitting a paging message, the paging message including the call identifier, the caller category, and at least one call statistic.

24. The computer readable medium of claim 23, where the at least one call statistic includes the time and date of the incoming call.

25. The computer readable medium of claim 21, further comprising one or more instructions for transmitting a wireless message, the wireless message including the call identifier, the caller category, and the at least one call statistic.

26. The computer readable medium of claim 25, where the at least one call statistic includes the time and date of the incoming call.

27. The computer readable medium of claim 21, further comprising one or more instructions for transmitting an e-mail message, the e-mail message including the call identifier, the caller category, and the at least one call statistic.

28. The computer readable medium of claim 27, where the at least one call statistic includes the time and date of the incoming call.

29. The computer readable medium of claim 28, where the caller category is assigned a priority caller category status.

30. The computer readable medium of claim 21, where the one or more instructions for performing include one or more instructions for retrieving the call identifier, the caller category, and the at least one call statistic from the database.

31. The computer readable medium of claim 21, further comprising one or more instructions for:
   emitting a ring with a predetermined ringing tone associated with the caller category;
   forwarding the incoming call to the voice mail component when the ring is not answered within a predetermined number of ringing cycles; and
   recording the at least one call statistic in the database, where the at least one call statistic includes the time and date of the incoming call.

32. The computer readable medium of claim 31, where the caller category is assigned a default caller category status.

33. The computer readable medium of claim 31, where the one or more instructions for performing include one or more instructions for retrieving the call identifier, the caller category, and the at least one call statistic from the database.

34. The computer readable medium of claim 21, further comprising one or more instructions for:
   emitting a ring with a predetermined ringing tone associated with the caller category;
   playing a recorded message to the caller;
   disconnecting the incoming call after playing the recorded message; and
   recording the at least one call statistic in the database, where the at least one call statistic includes the time and date of the incoming call.

35. The computer readable medium of claim 34, where the at least one call statistic further includes at least one of a telephone number or a category of the incoming call.

36. The computer readable medium of claim 34, where the one or more instructions for performing include one or more instructions for retrieving the call identifier, the caller category, and the at least one call statistic from the database.

37. The computer readable medium of claim 21, further comprising one or more instructions for transmitting an electronic message, the electronic message including at least one of a paging message, a wireless message, or an e-mail message.

* * * * *